(12) United States Patent
Nozawa

(10) Patent No.: US 7,103,048 B1
(45) Date of Patent: Sep. 5, 2006

(54) STATISTIC MULTIPLEX TRANSMISSION SYSTEM

(75) Inventor: Yoshiaki Nozawa, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/522,608

(22) Filed: Mar. 10, 2000

(30) Foreign Application Priority Data

Mar. 10, 1999 (JP) .................................. 11-063914

(51) Int. Cl.
H04L 12/28 (2006.01)
H04L 12/26 (2006.01)
H04J 3/04 (2006.01)

(52) U.S. Cl. ............................. 370/395.1; 370/230.1; 370/395.2; 370/468; 370/535; 370/401

(58) Field of Classification Search ................ 370/230, 370/232, 233, 234, 389, 395.1, 395.4, 395.61, 370/395.64, 395.65, 537, 538, 465, 468, 370/470, 471

See application file for complete search history.

(56) References Cited

U.S. PATENT DOCUMENTS

| | | | | | |
|---|---|---|---|---|---|
| 5,506,844 | A | * | 4/1996 | Rao | 370/468 |
| 5,526,345 | A | * | 6/1996 | Wallmeier | 370/395.4 |
| 5,604,731 | A | * | 2/1997 | Grossglauser et al. | 370/232 |
| 5,881,049 | A | * | 3/1999 | Beshai et al. | 370/395.21 |
| 5,946,323 | A | * | 8/1999 | Eakins et al. | 370/468 |
| 5,963,256 | A | * | 10/1999 | Tahara | 375/240.03 |
| 6,034,954 | A | * | 3/2000 | Takase et al. | 370/362 |
| 6,038,256 | A | * | 3/2000 | Linzer et al. | 375/240.12 |
| 6,052,384 | A | * | 4/2000 | Huang et al. | 370/468 |
| 6,072,773 | A | * | 6/2000 | Fichou et al. | 370/230 |
| 6,108,336 | A | * | 8/2000 | Duault et al. | 370/395.6 |
| 6,108,382 | A | * | 8/2000 | Gringeri et al. | 370/233 |
| 6,167,084 | A | * | 12/2000 | Wang et al. | 375/240.02 |

(Continued)

FOREIGN PATENT DOCUMENTS

JP 6-90236 3/1994

(Continued)

OTHER PUBLICATIONS

Japanese Office Action dated Apr. 24, 2002, with partial English translation.

(Continued)

*Primary Examiner*—Steven Nguyen
(74) *Attorney, Agent, or Firm*—Harrity Snyder, LLP

(57) ABSTRACT

In a network including a first local area ATM network, a second local area ATM network and a public ATM network connected to the first and second ATM local area networks, multiplex gateway devices are interposed between the local area ATM networks and the public ATM network, respectively. The multiplex gateway apparatus includes ATM transmission line units for calculating statistical information represented by a mean rate and a peak cell rate of ATM cells in the transmission ATM signal. A statistical multiplexing control unit conducts rate addition after statistical multiplexing according to the statistical information and determines the rate addition result. A piece-wise constant bit rate control unit calculates a required piece-wise constant bit rate on the basis of the rate addition result and performs cell multiplex control on the basis of this piece-wise constant bit rate. An ATM cell multiplexing/demultiplexing unit transmits a transmission statistical multiplex signal according to cell multiplexing control.

23 Claims, 4 Drawing Sheets

U.S. PATENT DOCUMENTS

| | | | |
|---|---|---|---|
| 6,181,711 B1 * | 1/2001 | Zhang et al. | 370/468 |
| 6,198,752 B1 * | 3/2001 | Lee | 370/395.65 |
| 6,307,836 B1 * | 10/2001 | Jones et al. | 370/230 |
| 6,307,838 B1 * | 10/2001 | Haas | 370/233 |
| 6,327,275 B1 * | 12/2001 | Gardner et al. | 370/535 |
| 6,392,994 B1 * | 5/2002 | Dubuc | 370/230 |
| 6,738,347 B1 * | 5/2004 | Mio et al. | 370/230 |
| 6,845,107 B1 * | 1/2005 | Kitazawa et al. | 370/537 |
| 6,859,496 B1 * | 2/2005 | Boroczky et al. | 375/240.01 |

FOREIGN PATENT DOCUMENTS

| | | | |
|---|---|---|---|
| JP | 9-8838 | | 1/1997 |
| WO | WO 9945739 | * | 9/1999 |

OTHER PUBLICATIONS

1994 Electronic Information Communication Association; Spring Conference B-765 (Mar. 10, 1994), p. 3-260.

* cited by examiner

STATISTIC MULTIPLEX TRANSMISSION SYSTEM

BACKGROUND OF THE INVENTION

This invention relates to a statistic multiplex transmission system. More particularly, this invention relates to a multiplex gateway apparatus for executing statistic multiplex transmission of images in public ATM inter-network communication.

Means for executing ATM transmission of image signals to which variable rate encoding is applied by an MPEG2 system using a terminal stipulated by ITU-T recommendation, H.310 (hereinafter called merely the "terminal device") is known generally. In other words, when ATM transmission is performed, image transmission means is known that connects a local area ATM network laid down in a first area to a local area ATM network laid down in a second area through a public ATM network, and transmits images.

An image ATM transmission according to the prior art will be explained with reference to FIG. 1.

In the example shown in FIG. 1, the image terminal device uses an H. 310 terminal stipulated in H. 310 of the ITU-T recommendation. It will be assumed hereby that a CPN local area network n is laid down in a first area and a CPN local area network p is laid down in a second area. The CPN local area network n and the CPN local area network p are connected to each other through a B-ISDN public network o. H. 310 terminals 31 to 33 are connected to the CPN local area network n as shown in FIG. 1. H. 310 terminals 34 to 36 are connected to the CPN local area network p. The H. 310 terminals 31 to 33 are connected to any of the H. 310 terminals through the local area ATM network—public ATM network—local area ATM network. For example, the H. 310 terminals 31 to 33 are connected to any of the H. 310 terminals through the local area ATM network—public ATM network—local area ATM network, respectively, as shown in FIG. 1. In other words, each H. 310 terminal is ATM connected independently in the point-to-point connection through the local area ATM network—public ATM network—local area ATM network.

In image transmission according to the prior art described above, the image signal that is VER-encoded at each H.310 terminal by an MPEG2 system is merely ATM connected independently. Therefore, a statistic multiplex effect cannot be imparted to the image signal outputted from each H. 310 terminal. In other words, the image transmission system using the H. 310 terminal according to the prior art involves the problem that the statistic multiplex effect cannot be acquired because each H. 310 terminal is connected independently in the point-to-point connection.

SUMMARY OF THE INVENTION

An aspect of the present invention is directed to providing a statistic multiplex transmission system capable of obtaining a statistic multiplex effect in an image transmission system, for example, in an image transmission system using H.310 terminals.

To perform multi-channel transmission of image signals, for example, the present invention interposes a statistic multiplex gateway to a connection portion between local area ATM networks, to which each terminal device is connected, and a public ATM network, and performs statistic multiplex transmission of the images by public ATM inter-network communication. When ATM multiplex transmission of the image signals, to which variable rate encoding is applied by an MPEG2 system using terminal device stipulated by H. 310, the ITU-T recommendation, is performed, the present invention offers an efficient multi-channel image transmission service as it connects a local area ATM network laid down in a certain area to a local area ATM network laid down in another area through a public ATM network. Furthermore, re-negotiation of the transmission rate after statistic multiplexing is repeated in a predetermined time interval through adaptive control of parameters acquired from image information, and piece-wise constant bit rate transmission is performed to vary the transmission rate of the public ATM network to reduce further a required transmission rate.

In a network that includes a first local area ATM network to which a plurality of first terminal device are connected, a second local area ATM network to which a plurality of second terminal device are connected and a public ATM network connected to the first and second local area ATM networks, the present invention provides a statistic multiplex transmission system that comprises a first multiplex gateway apparatus for connecting the first local area ATM network and the public ATM network and a second multiplex gateway apparatus for connecting the second local area ATM network and the public ATM network, wherein the first and second multiplex gateway devices receive transmission ATM signals from the first and second local area ATM networks, respectively, perform statistic multiplexing process of the transmission ATM signals to generate transmission statistic multiplex signals and transmit the transmission statistic multiplex signals to the public ATM network. Each of the first and second multiplex gateway devices includes means for calculating statistic information represented by a mean rate and a peak cell rate of ATM cells of the transmission ATM signals, means for conducting rate addition after statistic multiplexing according to the statistic information and determining the result of the rate addition, means for calculating a required piece-wise constant bit rate on the basis of the rate addition result and executing cell multiplex control on the basis of the piece-wise constant bit rate, and means for transmitting the transmission statistic multiplex signals according to this cell multiplex control.

DESCRIPTION OF THE PREFERRED EMBODIMENTS

Hereinafter, the present invention will be explained with reference to the accompanying drawings.

Figure 1:
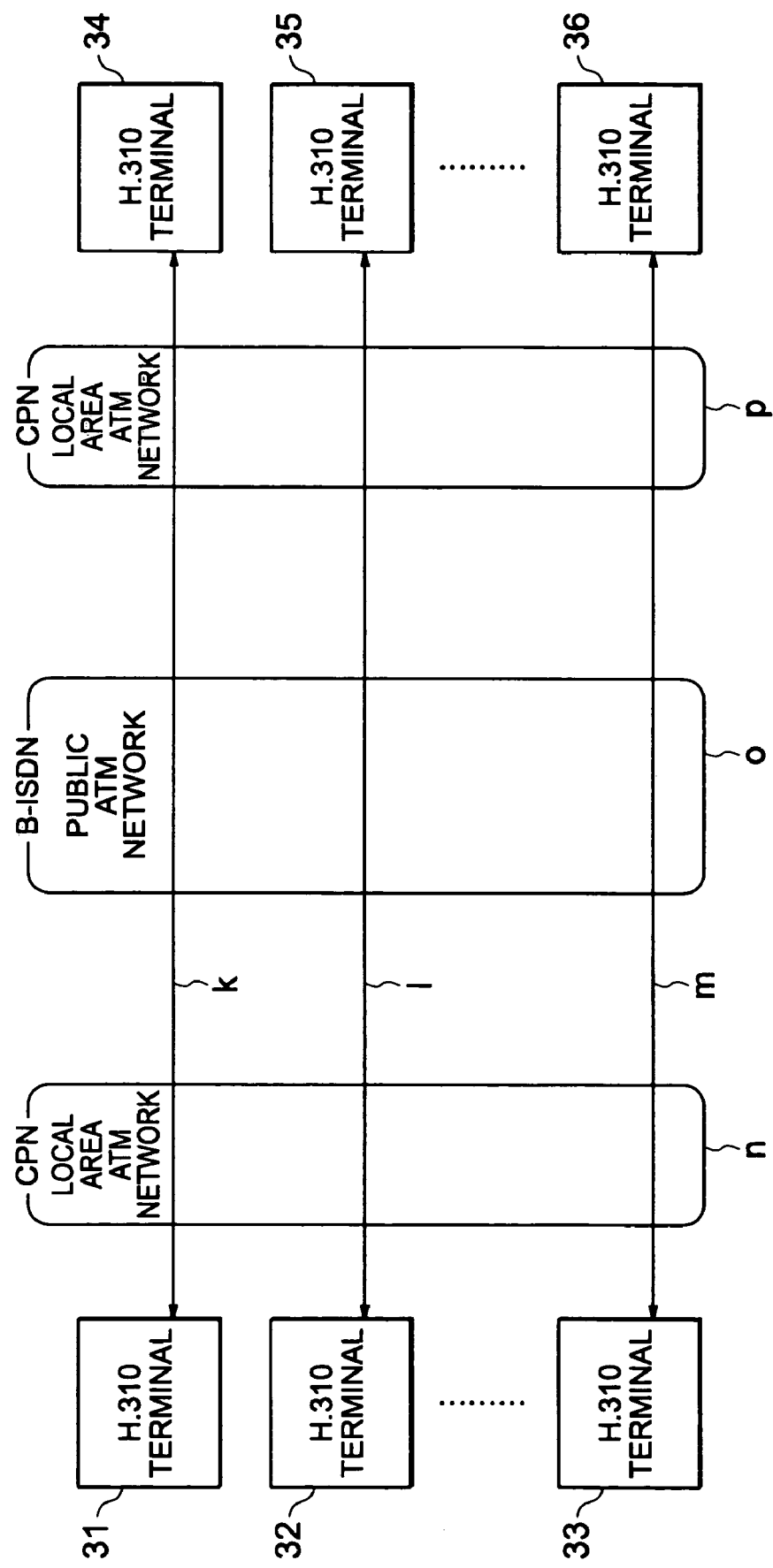
FIG. 1 shows an image transmission network according to the prior art.
Figure 2:
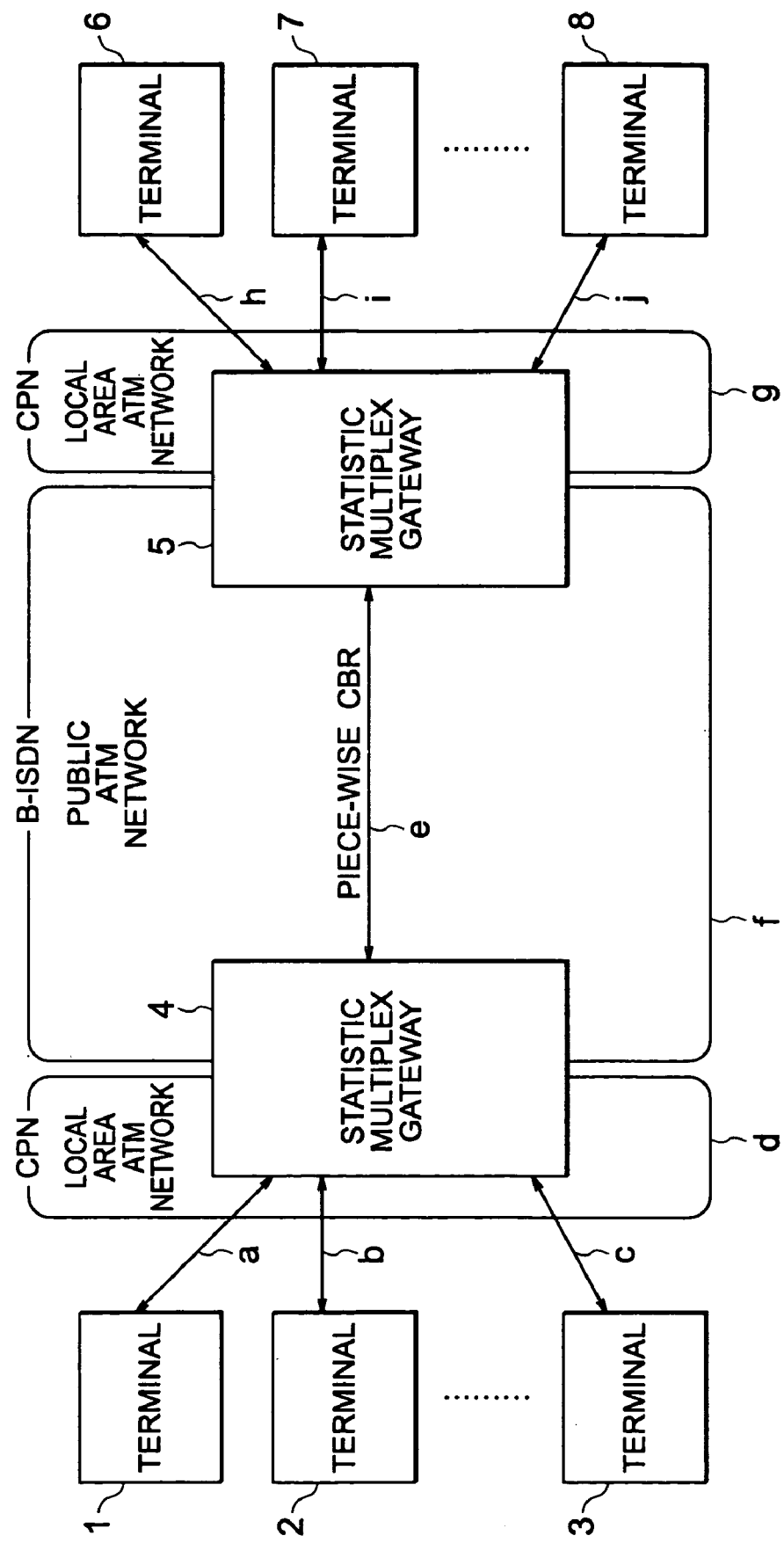
FIG. 2 shows a network using a multiplex gateway device according to the present invention.

Referring to FIG. 2, it will be assumed hereby that a transmission ATM signal a is outputted from a terminal 1, a transmission ATM signal b is outputted from a terminal 2 and a transmission ATM signal c is outputted from a terminal 3. The transmission ATM signals a to c are applied to a statistic multiplex gateway 4 through a local area ATM network d (CPN local area network; Customer Premises Network). The statistic multiplex gateway 4 performs statistic multiplexing process of the transmission ATM signals a to c, and generates a transmission statistic multiplex signal e.

This transmission statistic multiplex signal e is transmitted to a B-ISDN public ATM network f (B-ISDN public network) by use of a piece-wise constant bit rate transmission system (piece-wise CBR) having the transmission rate after statistic multiplexing process which varies in a predetermined time interval. The statistic multiplex signal e is connected to a statistic multiplex gateway 5 disposed in a separate area. The statistic multiplex gateway 5 separates the ATM signals that are subjected to statistic multiplexing. In other words, a receiving ATM signal h, a receiving ATM signal i and a receiving ATM signal j are generated when the transmission statistic multiplex signal e is separated. These receiving ATM signals h, i and j are transmitted to terminals 6, 7 and 8, respectively, through a local area ATM network (CPN network) g.

Communication in an opposite direction is established similarly. The transmission ATM signals h, i and j are supplied as the receiving ATM signals a, b and c to the terminals 1, 2 and 3, respectively. Incidentally, in the embodiment shown in the drawing, three terminals are shown connected to the local area ATM networks d and g, respectively, but the number of terminals connected to each local area ATM network is generally N (N: an integer of 2 or more). The terminals 1 to 3 and 6 to 8 are the terminals that are stipulated in H. 310 of the ITU-T recommendation.

Figure 3:
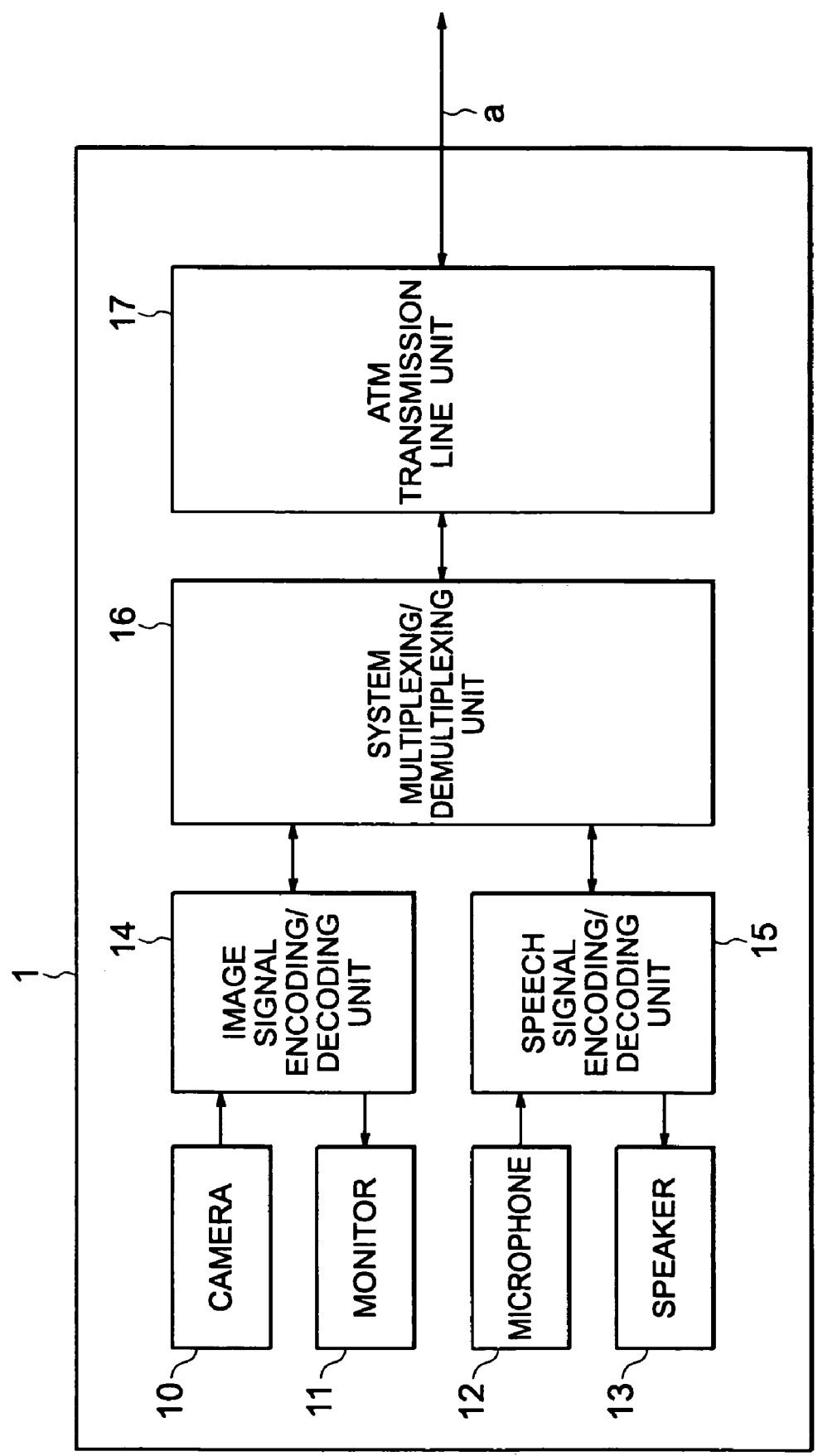
FIG. 3 is a block diagram showing in detail the terminal device shown in FIG. 2.

The construction of the terminals will be explained with reference to FIG. 3. Though the explanation will be given on the terminal 1 in the embodiment shown in the drawing, other terminals have the same construction.

When an encoding process is performed, a video signal inputted from a camera 10 is supplied to an image signal encoding/decoding unit 14. The image signal encoding/decoding unit 14 performs high efficiency encoding by a variable bit rate (VBR) mode for the video signals, generates a transmission video stream and supplies the transmission video stream to a system multiplexing/demultiplexing unit 16.

Audio signals inputted from a microphone 12 are supplied to a speech signal encoding/decoding unit 15. The speech signal encoding/decoding unit 15 performs high efficiency encoding for the audio signals, generates a transmission audio stream and supplies the transmission audio stream to a system multiplexing/demultiplexing unit 16.

The system multiplexing/demultiplexing unit 16 performs a multiplex processing for the transmission video stream and the transmission audio stream and supplies a transmission system stream to an ATM transmission line unit 17. The ATM transmission line unit 17 converts the transmission system stream to ATM cells to generate a transmission ATM signal a, and transmits the transmission ATM signal a to a local area ATM network d.

During the decoding processing, the ATM transmission line unit 17 performs an ATM terminating processing for the receiving ATM signal a inputted from the local ATM network d and supplies the receiving system stream to the system multiplexing/demultiplexing unit 16. The system multiplexing/demultiplexing unit 16 separates the receiving system stream into the receiving video stream and the receiving audio stream, and supplies them to the image signal encoding/decoding unit 14 and to the speech signal encoding/decoding unit 15, respectively.

The image signal encoding/decoding unit 14 performs the decoding processing of the receiving video stream and outputs the video signals to a monitor 11. On the other hand, the speech signal encoding/decoding unit 15 performs the decoding processing of the receiving audio stream, and supplies the audio signals to a speaker 13.

Figure 4:
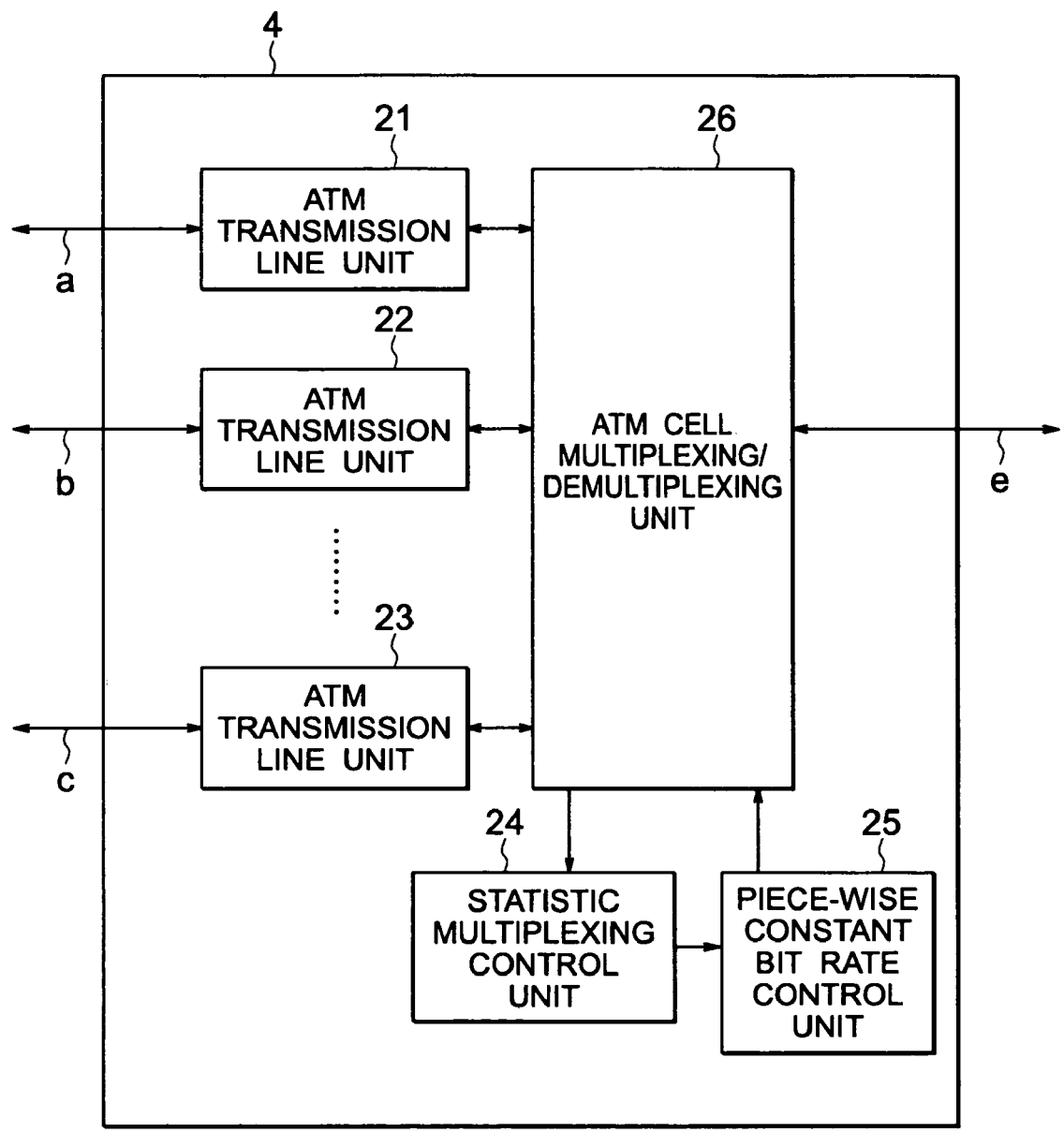
FIG. 4 shows in detail the multiplex gateway device shown in FIG. 2.

Next, the construction of the statistic multiplex gateway will be explained with reference to FIG. 4. The statistic multiplex gateway 4 in the embodiment shown in the drawing will be explained hereby, but other statistic multiplex gateways have the same construction.

The transmission ATM signals a to c outputted from the terminals 1 to 3 in the manner described above are supplied to ATM transmission line units 21 to 23, respectively. Each of these ATM transmission line units 21 to 23 calculates statistic information represented by the mean rate and the peak cell rate of the inputted ATM cells, and outputs the statistic information and the ATM cells to an ATM cell multiplexing/demultiplexing unit 26.

The ATM cell multiplexing/demultiplexing unit 26 applies the statistic information to a statistic multiplexing control unit 24. The statistic multiplexing control unit 24 performs rate addition after statistic multiplexing according to the statistic information, and applies this rate addition result to a piece-wise constant bit rate control unit 25. The piece-wise constant bit rate control unit 25 calculates a required piece-wise constant bit rate on the basis of the rate addition result. The ATM cell multiplexing/demultiplexing unit 26 performs cell multiplexing control on the basis of the piece-wise constant bit rate. In consequence, the ATM cell multiplexing/demultiplexing unit 26 performs the multiplexing process of the ATM cells and transmits the transmission statistic multiplex signal e to a B-ISDN public ATM network.

As described above, the present invention connects a plurality of image transmission terminals connected to the same CPN (Customer Premises Network) local area network to the terminals of the CPN local area network laid down in another area through the B-ISDN public network. Since the present invention performs statistic multiplexing in this connection, the present invention can acquire both statistic multiplexing gain and re-negotiation gain in comparison with the case where image channels are discretely connected one by one between individual terminals.

What is claimed is:

1. A statistical multiplex transmission system for use in a network which includes a first local area network including a plurality of first terminal devices, a second local area network including a plurality of second terminal devices, and a public network connected to said first and second networks, comprising:

a first multiplex gateway device for connecting said first local area network and said public network;

a second multiplex gateway device for connecting said second local area network and said public network, wherein said first and second multiplex gateway devices are configured to:

receive transmission signals from said first and second local area networks, respectively, perform a statistical multiplexing process to determine statistical information based on a mean rate and a peak cell rate associated with said transmission signals and generate transmission statistical multiplex signals based on the statistical information, and transmit said transmission statistical multiplex signals to said public network;

a statistical multiplexing control unit, operably connected to one of the first or second multiplex gateway device, for performing a rate addition after said statistical multiplexing process according to statistical information from said transmission signals.

2. The statistical multiplex transmission system as claimed in claim 1, wherein said first and second multiplex gateway devices are configured to transmit said transmission statistical multiplex signals by a piece-wise constant bit rate transmission system including a transmission rate which varies in a predetermined time interval after the statistical multiplexing process.

3. The statistical multiplex transmission system as claimed in claim 1, wherein said first and second multiplex gateway devices are configured to:
receive said transmission statistical multiplex signals,
separate said transmission statistical multiplex signals, and
generate a plurality of receiving signals, and
wherein said first and second multiplex gateway devices are configured to transmit said receiving signals to said first and second terminal devices through said first and second local area networks, respectively.

4. The statistical multiplex transmission system as claimed in claim 3, wherein said first and second multiplex gateway devices comprise:
first means for calculating the statistical information represented by a mean rate and a peak cell rate of cells in said transmission signals; and
second means for performing a multiplexing process on said cells according to said statistical information, and for transmitting said transmission statistical multiplex signals to said public network.

5. The statistical multiplex transmission system as claimed in claim 4, wherein said second means includes:
third means for conducting rate addition after the multiplexing process according to said statistical information and for determining a rate addition result;
fourth means for calculating a required piece-wise constant bit rate on the basis of said rate addition result, and for performing cell multiplex control on the basis of said piece-wise constant bit rate; and
fifth means for transmitting said transmission statistical multiplex signal according to said cell multiplex control.

6. The statistical multiplex transmission system as claimed in claim 5, wherein said fifth means receives said transmission statistical multiplex signal to separate said transmission statistical multiplex signal, and generates a receiving signal.

7. The system of claim 1, further comprising:
a control unit operably connected to said first multiplex gateway device,
wherein the control unit re-negotiates a transmission rate of said transmission statistical multiplex signals after said statistical multiplexing process, in a predetermined time interval, through adaptive control of parameters acquired from the transmission signals.

8. The system of claim 1, wherein the plurality of first and second terminal devices are International Telecommunications Union (ITU) recommendation H.310 compliant.

9. The system of claim 1, further comprising:
a piece-wise constant bit rate control unit, operably connected to the statistical multiplexing control unit, for receiving the rate addition calculation from said statistical multiplexing control unit, and calculating a piece-wise constant bit rate for transmission of said transmission statistical multiplex signals to said public network.

10. The system of claim 1, further comprising:
a transmission line unit, operably connected to the statistical multiplexing control unit, for calculating the statistical information from cells in said transmission signals, and transmitting the statistical information and the cells to a cell multiplexing/demultiplexing unit.

11. The system of claim 10, wherein the cell multiplexing/demultiplexing unit is operably connected to one of the first or second multiplex gateway device, and performs cell multiplexing control on the basis of the piece-wise constant bit rate, and
wherein the cell multiplexing/demultiplexing unit transmits the transmission statistical multiplex signals to the statistical multiplexing control unit.

12. A statistical multiplex transmission system for use in a network that includes a first local area network including a plurality of first terminal devices, a second local area network including a plurality of second terminal devices, and a public network connected to said first and second networks, the system comprising:
a first multiplex gateway device for connecting said first local area network and said public network;
a second multiplex gateway device for connecting said second local area network and said public network,
wherein said first and second multiplex gateway devices are configured to:
receive transmission signals from said first and second local area networks, respectively,
perform a statistical multiplexing process to determine statistical information based on a mean rate and a peak cell rate associated with said transmission signals and generate statistical multiplex transmission signals based on the statistical information, and
transmit said statistical multiplex transmission signals to said public network based on a piece-wise constant bit rate that varies in a predetermined time interval;
a statistical multiplexing control unit operably connected to the first or second multiplex gateway device, for performing a rate addition after said statistical multiplexing process according to statistical information from said transmission signals.

13. The system of claim 12, further comprising:
a control unit, operably connected to said first multiplex gateway device,
wherein the control unit re-negotiates a transmission rate of said statistical multiplex transmission signals after said statistical multiplexing process, in a predetermined time interval, through adaptive control of parameters acquired from the transmission signals.

14. The system of claim 12, wherein the plurality of first and second terminal devices are International Telecommunications Union (ITU) recommendation H.310 compliant.

15. The system of claim 12, further comprising:
a piece-wise constant bit rate control unit, operably connected to the statistical multiplexing control unit, for receiving a result of the rate addition from said statistical multiplexing control unit and calculating a piece-wise constant bit rate for transmission of said statistical multiplex transmission signals to said public network based on the result of the rate addition.

16. The system of claim 12, further comprising:
a transmission line unit, operably connected to the statistical multiplexing control unit, for calculating statistical information of cells in said transmission signals, and transmitting the statistical information and the cells to a cell multiplexing/demultiplexing unit.

17. The system of claim 16, wherein the cell multiplexing/demultiplexing unit is operably connected to one of said first or second multiplex gateway device, and performs cell multiplexing control on the basis of the piece-wise constant bit rate, and wherein the cell multiplexing/demultiplexing unit transmits the statistical multiplex transmission signals to the statistical multiplexing control unit.

18. A method for statistical multiplex data transmission in a network including a first local area network connected to a plurality of first terminal devices, a second local area network connected to a plurality of second terminal devices, and a public network connected to said first and second networks, the method comprising:

connecting a first multiplex gateway device to said first local area network and said public network;

connecting a second multiplex gateway device to said second local area network and said public network;

receiving ATM transmission signals from said first and second local area networks into said first and second multiplex gateway devices, respectively;

performing a statistical multiplexing process to determine statistical information based on a mean rate and a peak cell rate associated with said transmission signals and generate transmission statistical multiplex signals based on the statistical information;

transmitting said transmission statistical multiplex signals to said public network based on a piece-wise constant bit rate that varies in a predetermined time interval after the statistical multiplexing process; and performing a rate addition after said statistical multiplexing process according to statistical information from said transmission signals.

19. The method of claim 18, further comprising:

receiving a result of the rate addition; and calculating a piece-wise constant bit rate for transmission of said transmission statistical multiplex signals to said public network based on the result of the rate addition.

20. The method of claim 19, further comprising:

calculating statistical information of cells in said transmission signals, and transmitting the statistical information and the cells to a cell multiplexing/demultiplexing unit.

21. The method of claim 20, further comprising:

performing cell multiplexing control on the basis of the piece-wise constant bit rate.

22. A statistical multiplexing device, comprising:

a plurality of transmission line units to:

receive transmission signals, and perform a statistical multiplexing process to determine statistical information based on a mean rate and a peak cell rate associated with the transmission signals;

a first control unit to determine a piece-wise constant bit rate based on the statistical information; and a multiplexing/demultiplexing unit to:

generate statistical multiplex signals based on the piece-wise constant bit rate, and transmit the statistical multiplex signals to a public network; and a second control unit to perform a rate addition after the statistical multiplexing process according to statistical information from the transmission signals.

23. A statistical multiplexing method performed by a network device, comprising:

receiving transmission signals;

performing a statistical multiplexing process to determine statistical information based on a mean rate and a peak cell rate associated with the transmission signals;

determining a piece-wise constant bit rate based on the statistical information;

generating statistical multiplex signals based on the piece-wise constant bit rate;

transmitting the statistical multiplex signals to a public network; and performing a rate addition after the statistical multiplexing process according to statistical information from the transmission signals.

* * * * *